United States Patent [19]
Ishikawa et al.

[11] Patent Number: 4,928,803
[45] Date of Patent: May 29, 1990

[54] POWER TRANSMISSION APPARATUS

[75] Inventors: Osamu Ishikawa; Kazuyoshi Watanabe, both of Tochigi, Japan

[73] Assignee: Tochigifujisangyo Kabushiki Kaisha, Tochigi, Japan

[21] Appl. No.: 316,287

[22] Filed: Feb. 27, 1989

[30] Foreign Application Priority Data

Mar. 1, 1988 [JP] Japan .................................. 63-45746

[51] Int. Cl.$^5$ .............................. F16D 31/00
[52] U.S. Cl. .............................. 192/58 B; 192/58 R
[58] Field of Search ................... 192/58 B, 58 C, 58 R

[56] References Cited

U.S. PATENT DOCUMENTS

| 3,380,565 | 4/1968 | Wilkinson. | |
| 4,690,258 | 9/1987 | Teraoka et al. | 192/58 C |
| 4,703,842 | 11/1987 | Leinfellner et al. | 192/58 B |
| 4,721,010 | 1/1988 | Sheldon et al. | 74/650 |
| 4,782,930 | 11/1988 | Kuroiwa et al. | 192/58 C |

FOREIGN PATENT DOCUMENTS

| 3708054 | 10/1987 | Fed. Rep. of Germany. | |
| 3701884 | 12/1987 | Fed. Rep. of Germany | 192/58 B |
| 0294224 | 12/1986 | Japan | 192/58 B |
| 1158689 | 7/1969 | United Kingdom. | |
| 2044894 | 10/1980 | United Kingdom. | |

OTHER PUBLICATIONS

English Abstract of Japanese Pat. Appln. No. 62-165032

Primary Examiner—Rodney H. Bonck
Attorney, Agent, or Firm—Samuels, Gauthier & Stevens

[57] ABSTRACT

To facilitate subassembly of a power transmitting (viscous coupling) apparatus without use of a hub, the apparatus comprises a multistep shaft formed with an input portion and a multistep shoulder portion steppedly narrowed in diameter from the input portion to the opposite side; a casing fitted to the multistep shaft from the opposite side of the shaft and formed with an output portion; and two sets of resistance plates engaged with and arranged along the axial direction of each of the multistep shaft and the casing, within a working chamber formed between the shaft and the casing, so as to intervene between two other resistance plates.

2 Claims, 2 Drawing Sheets

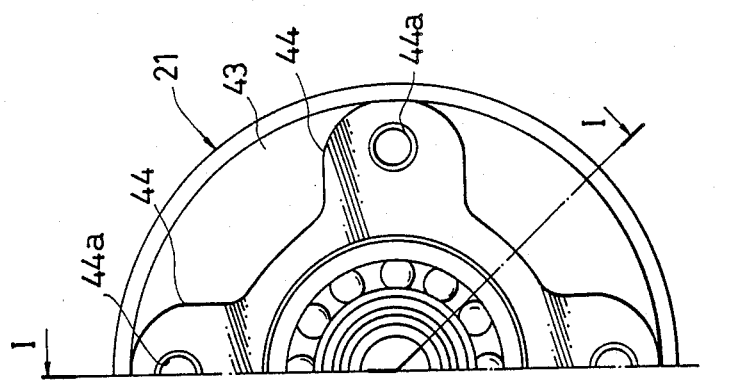

POWER TRANSMISSION APPARATUS

BACKGROUND OF THE INVENTION

1. Field of the Invention

The present invention relates to a power transmission apparatus used for four-wheel drive vehicles, for instance, and more specifically to a power transmission apparatus for transmitting power via viscous resistance of viscous fluid applied to a plurality of resistance plates arranged within a working chamber of the apparatus.

2. Description of the Prior Art

An example of the above-mentioned power transmission apparatus is disclosed as a viscous coupling apparatus in Japanese Published Unexamined (Kokai) Patent Application No. 58-50349. In this viscous coupling apparatus, a plurality of resistance plates are arranged on the casing side and the shaft side, respectively along the axial direction thereof so as to be alternately opposite to each other and extend in the radical direction thereof within a working chamber filled with a viscous fluid (e.g. silicon oil). Therefore, when either of the casing or shaft is rotated, power is transmitted from one to the other via fluid viscous resistance generated by relative rotation between these resistance plates.

In the above-mentioned prior-art power transmission apparatus or viscous coupling apparatus, however, the working chamber is airtightly formed by sealing members disposed between the casing and two accel shafts and further the resistance plates fixed to the shaft side within the working chamber filled with viscous fluid are arranged along splines formed on the outer circumferential surface of an end of each of the two accel shafts. Therefore, it has been impossible to subassemble the apparatus after the viscous fluid is put into the working chamber. In other words, since the viscous fluid is put after the resistance plates have been assemble and further the sealing members have been attached during vehicle assembly process, there exists a problem in that vehicle assembly work is complicated and therefore vehicle assembly reliability is deteriorated.

To overcome the above-mentioned problem, another prior-art viscous coupling apparatus is disclosed in Japanese Published Unexamined (Kokai) Patent Appli. No. 62-165032. In this apparatus, the working chamber is formed by an outer cylindrical member, two side flanges formed integral with the outer cylindrical member on both the sides thereof, and a hub arranged on the inner circumferential side of the side flanges. Further, a plurality of resistance plates are arranged along the axial direction and alternately fixed to the inner circumferential wall of the, outer cylindrical member and the outer circumferential surface of the hub so as to extend in the radical direction within a working chamber filled with viscous fluid. The inner circumference of the hub is linked with an input shaft to which power is applied and further loosely fitted to the side flanges. Sealing members are disposed at the fitting portion between the hub and the side flanges to form an airtight working chamber.

The above-mentioned second prior-art viscous coupling apparatus has such an advantage as to enable the apparatus to be subassembled; however, since a hub is provided along the axial direction, there exists another problem in that the volume or the radical length of the working chamber is reduced and therefore it is difficult to obtain desired performance. To overcome this problem when the axial length of the working chamber is increased, the apparatus is inevitably increased both in size and weight.

In addition, since the inner circumference of the hub must be centered with respect to the apparatus axis and further the outer circumference of the hub must be centered with respect to the outer cylindrical member, there exist other problems in that the manufacturing process and assembly process are difficult.

SUMMARY OF THE INVENTION

With these problems in mind, therefore, it is the primary object of the present invention to provide a power transmission apparatus which is easy to manufacture and assemble and small in size, while enabling subassembly thereof.

To achieve the above-mentioned object, the power transmission apparatus of the present invention comprises: (a) a multistep shaft formed with a first connecting portion at a first end thereof and a multistep shoulder portion steppedly narrowed in diameter toward a second end thereof opposite to the first end; (b) a casing fitted to said shaft from the second end of said multistep shaft and formed with a second connecting portion near the second end of said multistep shaft, a working chamber being formed between said multistep shaft and said casing so as to be filled with viscous fluid; (c) a plurality of first resistance plates engaged with and arranged along an axial direction of said multistep shaft within the working chamber; and (d) a plurality of second resistance plates engaged with and arranged along an axial direction of said casing within the working chamber, said first and second plural resistance plates being alternately arranged so as to intervene between two other resistance plates. The first connecting portion of said multistep shaft is an input portion to which power is applied, and the second connecting portion of said casing is an output portion from which power is transmitted outside.

In the apparatus according to the present invention, since a connecting portion is formed at an input end of the shaft, and a stepped portion steppedly narrowed toward an output end is formed at the output end thereof so that the casing can be fitted from the output side of the shaft to form the working chamber, it is possible to subassemble the apparatus and therefore to facilitate the assembly work.

Further, since a plurality of resistance plates are arranged at the stepped portion of the shaft, it is possible to eliminate the hub required for the prior-art apparatus, thus minimizing the size of the apparatus.

BRIEF DESCRIPTION OF THE DRAWINGS

The features and advantages of the power transmission apparatus according to the present invention will be more clearly appreciated from the following description taken in conjunction with the accompanying drawings in which like reference numerals designates corresponding elements and in which:

FIG. 2 is a cross-sectional view showing a power transmission apparatus of the present invention, taken along the line I—I in FIG. 3; and FIG. 3 is a half front view showing the same apparatus.

DETAILED DESCRIPTION OF THE PREFERRED EMBODIMENTS

Figure 1:
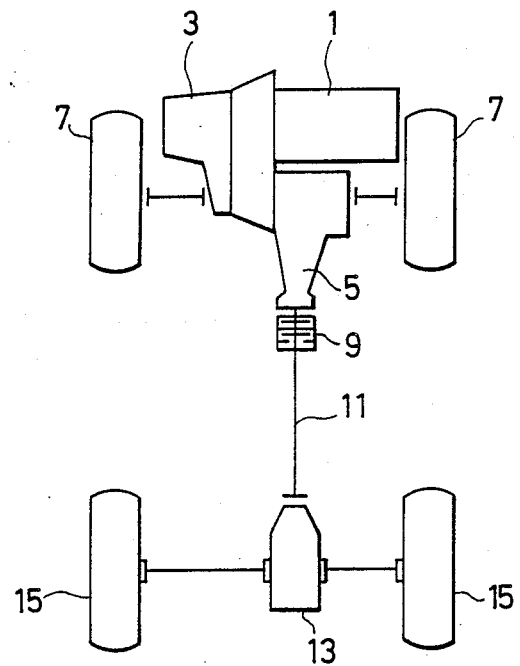
FIG. 1 is an illustration showing an entire four-wheel drive system to which the power transmission apparatus according to the present invention is applied.

An embodiment of the present invention will be explained hereinbelow with reference to the attached drawings. FIG. 1 is an illustration showing an entire four-wheel drive system to which the power transmission apparatus according to the present invention is applied. In this drawing an engine 1 and a transmission 3 are arranged along the lateral direction and on the front side of the vehicle. An output (wheel drive power) obtained through the transmission 3 is transmitted to the right and left front wheels 7 via a transfer 5, and further to the right and left rear wheels 15 via a viscous coupling apparatus 9, a propeller shaft 11 and a final drive unit 13.

The viscous coupling apparatus 9 for transmitting power has such a function that a small torque is transmitted from an input shaft to an output shaft when difference in the number of rotation between the two shafts is small, but a large torque is transmitted when the difference is large.

As shown in FIG. 2, the viscous coupling (power transmitting) apparatus 9 comprises a shaft 19 formed with a flange 17 serving as a first connecting portion (to which an input power is applied), a casing 21 rotatably fitted to the outer circumference of the shaft 19, and an airtight working chamber 23 formed between the shaft 19 and the casing 21. This flange portion 17 is fixed to an output shaft of the transfer 5, in practice.

The shaft 19 is formed into multistep or multishoulder shape composed of a first step portion 25, a second step portion 27, a third step portion 29, a fourth step portion 31, a fifth step portion 33, a sixth step portion 35 and a seventh step portion in such a way that the diameters of these step portions are reduced step by step from the flange 17 formed at one (input) end thereof to the other (output) end thereof. On the other hand, the casing 21 is formed with an outer cylindrical portion 41 having a flange portion 39, and an output member 43 is fitted to the open end of the outer cylindrical portion 41 and fixed thereto by welding, for instance. As shown in FIG. 3., the output member 43 is formed with a boss portion 44 having four threaded portions 44a and serving as a second connecting portion (from which an output power is transmitted). This boss portion 44 is connected to the propeller shaft 11 via a flange portion of a universal joint (not shown), in practice. Further, the casing 21 is fitted to the shaft 19 from the output end side, and rotatably supported by the shaft 19 in such a way that an annular projection 45 of the flange portion 39 of the casing 21 is supported by the third step portion 29 of the shaft 19 via a bearing 47 and further the output member 43 is supported by the seventh step portion 37 of the shaft 19 via another bearing 49. Further, a sealing member 51 is provided between the fourth step portion 31 of the shaft 19 and the flange portion 39 of the casing 21 and further another sealing member 53 is provided between the sixth step portion 35 of the shaft 19 and the output member 43, so that a working chamber 23 is airtightly formed so as to be filled with a viscous fluid such as silicon oil.

Within the working chamber 23, a plurality of resistance plates 57 engaged with splines 55 formed in the inner circumferential wall of the outer cylindrical member 41 of the casing 21 and another plurality of resistance plates 61 engaged with splines 59 formed in the outer circumferential surface of the fifth step portion 33 of the shaft 19 are alternately arranged so as to intervene between the two other resistant plates. Further, plural locating spacer rings 63 are disposed between the two resistance plates 57 spline engaged with the casing 21 to maintain a predetermined distance therebetween in such a way as to be separated away from the outer circumference of the resistance plates 61 spline engaged with the shaft 19. The shaft 19 is formed into a hollow shaft formed with an axial through bore 65 in order to reduce the weight thereof.

Further, a sealing member 69 is disposed between the second step portion 27 of the shaft 19 and a flange portion 67 of an annular projection 45 of the casing 21 without preventing the relative rotation between the shaft 19 and the casing 21. The reference numeral 71 denotes a dust cover disposed in contact with a lip portion of the sealing member 69.

The operation of the first embodiment of the apparatus will be described hereinbelow. A power of the engine 1 is transmitted to the front wheels 7 via the transmission 3 and the transfer 5 and, on the other hand, to the rear wheels 15 via the viscous coupling (power transmission) apparatus 9, the propeller shaft 11 and the final drive unit 13.

A rotational power inputted from the transfer 5 to the shaft 19 of the viscous coupling apparatus 9 is transmitted from the resistance plates 61 rotatable integral with the shaft 19 to the resistance plates 57 rotatable integral with the casing 21 via a viscous resistance of fluid filling the working chamber 23, and further transmitted to the propeller shaft 11 connected to the output member 43 via a universal joint.

In the above-mentioned viscous coupling apparatus 9, since the shaft 19 to which power is inputted is formed with the flange portion 17 (an input connecting portion) on one (input) end side thereof and the multistep portions on the other (output) side thereof in such a way that diameters of the shaft 19 decrease in step fashion, it is possible to fit the casing 21 to the shaft 19 from the other end (output) side thereof during assembly process. In addition, since the working chamber 23 filled with viscous fluid is formed between a step portion (the fifth step portion 33 in this embodiment) and the casing 21, and further plural resistance plates 57 engaged with the splines 55 formed in the inner circumferential wall of the casing 21 and plural resistance plates 61 engaged with the splines 59 formed in the outer circumferential surface of the fifth step portion 33 of the shaft 19 are alternately arranged one by one, it is unnecessary to provide a hub member on the shaft side as in the prior-art apparatus. Therefore, the viscous coupling apparatus can be subassembled as a unit, so that it is possible to simplify the assembly work of the apparatus to a vehicle body as shown in FIG. 1.

In addition, since no hub is provided on the shaft side in the viscous coupling apparatus 9 of the present invention, the volume or the radial length of the working chamber 23 is not reduced. Therefore, it is possible to increase the volume of the working chamber 23 without increasing the axial length thereof or to reduce the size of the apparatus.

An apparent from the above description in the apparatus according to the present invention, since there are provided a shaft having a first connecting portion on one (input) end side and a multistep portions on the other (output) end side, a working chamber formed between the shaft and the casing fitted to the shaft from the other (output) end side and filled with viscous fluid, and two sets of plural resistance plates alternately spline engaged with the casing and the shaft within the working chamber, it is possible to subassemble the apparatus in the state where the working chamber is filled with viscous fluid, thus facilitating the vehicle assembly work. In addition, since the plural resistance plates are directly engaged with a certain step portion of the shaft, it is possible to eliminate the use of the conventional hub and therefore to reduce the volume or the size of the apparatus.

What is claimed is:

1. A power transmission apparatus comprising:
   (a) a multistep shaft formed with a first connecting portion at a first end thereof and multistep shoulder portions successively reduced in diameter toward a second end thereof opposite to the first end, two sealing members being disposed at two inwardly formed multistep shoulder portions and two bearing members being disposed at two outwardly formed multistep shoulder portions, respectively;
   (b) a casing fitted to said shaft from the second end thereof, with the sealing members and the bearing members interposed between the multistep shoulder portions of said multistep shaft and said casing, aid casing being formed with a second connecting portion near the second end of said multistep shaft, a working chamber being formed between said multistep shaft and said casing so as to be filled with viscous fluid;
   (c) a plurality of first resistance plates engaged with and arranged axially along a portion of said multistep shaft within the working chamber; and
   (d) a plurality of second resistance plates engaged with and arranged axially along a portion of said casing within the working chamber, said first and second resistance plates being alternately arranged with respect to each other.

2. The power transmission apparatus of claim 1, wherein another sealing member is further disposed at an outermost multistep shoulder portion of said multistep shaft.

* * * * *